United States Patent Office 3,433,837
Patented Mar. 18, 1969

3,433,837
METHOD OF PRODUCING ADAMANTANE-2-ONE
Hendrik Willem Geluk, Van Houtenlaan, Weesp, Netherlands, assignor to North American Philips Company, Inc., New York, N.Y., a corporation of Delaware
No Drawing. Filed July 12, 1966, Ser. No. 564,673
Claims priority, application Netherlands, July 15, 1965, 6509139
U.S. Cl. 260—586   8 Claims
Int. Cl. C07c 45/16, 45/00

ABSTRACT OF THE DISCLOSURE

Production of adamantane-2-one by treatment of adamantane or 1 substituted derivatives thereof with concentrated sulfuric acid or fluorosulfonic acid.

The invention relates to a new and novel method of producing adamantane-2-one.

Adamantane-2-one is a known compound described, among other places, in J. Org. Chem., 26, 2207–2212 (1961). As is shown in this article, adamantane-2-one is useful as an intermediate for the production of 2-amino-adamantane. The latter compound 2-amino-adamantane has been shown in Dutch patent application 6,505,398 to have antiviral activities.

Several methods of producing adamantane-2-one are known, but they all suffer from the fact that they result in very low yields of the adamantane-2-one. Thus, the oxidation of adamantane in air in the presence of cobalt-acetate tetrahydrate and di-t-butyl-peroxide, as described in J. Org. Chem., 26, 2207–2212 (1961) results in a yield of only 10%.

Further, the hydroxylation of adamantane to 2-hydroxy-adamantane and the oxidation of this latter substance to adamantane-2-one according the method described in J. Am. Chem. Soc., 83, 182–187 (1961) results in a yield of only 7.2%.

It is a principal object of my invention therefore to provide a new and improved method of producing adamantane-2-one.

This and other objects of my invention will be apparent from the description that follows.

According to my invention, I have quite unexpectedly found that adamantane-2-one can be obtained in high yields by treating adamantane or 1 substituted adamantane with concentrated sulphuric acid, fluorosulfonic acid or mixture thereof. I have found that particularly with concentrated sulphuric acid high yields are obtained.

As the starting material adamantane or adamantane substituted at the 1 position may be employed.

Representative examples of such substituted adamantane are 1-hydroxy adamantane, the 1-halogenated adamantane, 1-ethoxy adamantane, 1-methoxy adamantane, the organic and inorganic esters of 1-hydroxy-adamantane, 1-adamantyl carboxylic acid, methanol and ethanol esters of 1-adamantyl carboxylic acid, 1-adamantyl carboxylamides, 1-cyano adamantane and 1-amino-adamantane derivatives wherein the amino moiety is substituted with an electro-negative substituent, for example an acyl group, a nitrile group or a sulfonyl group.

Examples of inorganic esters of 1-hydroxy-adamantane that may be employed are the nitrate, sulfate, hydrosulfate, meta phosphate, ortho phosphate.

Some examples of organic esters of 1-hydroxy adamantane that may be employed are the acetate, the propionate, the tosylate, the succinate, the palmitate, and the valerate.

The 1-halogeno-adamantanes that may be employed may be 1-chloro, 1-bromo, 1-fluoro or 1-iodo-adamantane.

However, it is preferred that the adamantane-2-one be prepared from adamantane, 1-hydroxy-adamantane or 1-chloro-adamantane, particularly from adamantane, since these basic materials are readily obtainable.

If 1-bromo- or 1-iodo-adamantane is employed, it is advantageous to add a silver salt or an other halogen binder.

The reaction is preferably carried out in 75% to 100% sulphuric acid, particularly in 96% sulphuric acid. Sulphuric acid having a content of $SO_3$ may also be employed.

Apart from water, compounds being a weaker base than water may be used to dilute the sulphuric acid to the desired extent. Suitable substances for this purpose are, for example, phosphoric acid, aliphatic carboxylic acids, such as acetic acid, propionic acid and hydrohalic acids such as hydrochloric acid and hydrofluoric acid.

In order to obtain a sulphuric-phosphoric acid mixture 96% sulphuric acid may be used with phosphorpentoxide.

The reaction temperature may fluctuate between fairly wide limits. The temperature is preferably adjusted between 0° C. and 100° C.

The invention will now be described more fully with reference to the following examples.

EXAMPLE 1

50 ml. of 96% sulphuric acid was heated at 75° C. While stirring the acid rapidly, 2.75 g. of adamantane was added thereto. Stirring was continued, and the temperature of the reaction mixture was maintained at 75° C. The sulphur dioxide developed during the reaction was allowed to escape from the reaction mixture while moisture from the air was prevented to enter.

A solid substance deposited on the wall of the reaction vessel was regularly brought back into the liquid.

After 5 hours the red-brown reaction mixture, which no longer contained solid substances, was poured on ice. The mixture was then extracted twice with ether. A brown-black, tar-like by-product, which was separated out, was removed. The ether extracts were collected, washed with water and dried over sodium sulphate. After the solvent was evaporated, a light yellow to light beige crystalline substance was left. This substance was chromatographed through alumina and crystallized from petroleum-ether.

Yield 65% of adamantane-2-one. Melting point 284–286° C.

In the same manner adamantane-2-one was produced from five other substances. In the following table, these starting materials, the reaction periods, the quantities employed and the yields of adamantane-2-one are shown.

TABLE

| Example | Starting material | Quantity (g.) | Reaction period (hrs.) | Yield, percent |
|---|---|---|---|---|
| 2 | ad-OH | 6.1 | 5 | 84 |
| 3 | ad-Cl | 6.82 | 5 | 68 |
| 4 | ad-O—C(=O)—CH₃ | 7.75 | 4.25 | 73 |
| 5 | ad-N—C(=O)—CH₃ | 7.47 | 4.75 | 63 |
| 6 | ad-COOH | 4.5 | 12 | 24 | ad=1-adamantyl.

EXAMPLE 7

13.6 g. of silver sulphate were dissolved in 50 ml. of 96% sulphuric acid. While stirring this solution vigorously a suspension of 17.2 g. of 1-bromo-adamantane in 50 ml. of 96% sulphuric acid was added. The resultant mixture was stirred at 25° C. for nine days. After extraction from petroleum-ether (temperature 40-60° C.) the precipitated silver bromide was filtered off on a glass filter. The clear, red-brown filtrate was poured out on ice and extracted twice with ether. The combined extracts were washed with water and dried by freezing at −20° C., where after the solvent was evaporated. A crystalline residue of 9.9 g. was obtained. This crystalline substance was dissolved in ether and chromatographed through alumina. After the eluate was evaporated to dryness, 8.6 g. of pure adamantane-2-one was obtained, that is a yield of 72%.

EXAMPLE 8

50 ml. of a mixture of 85% sulphuric acid and 15% propionic acid was heated at 75° C. While stirring, 6.1 g. of 1-hydroxy-adamantane were added. After a reaction period of 1¾ hours, the reaction mixture was poured on ice and extracted with ether. The extract was washed with water and dried over $Na_2SO_4$ and evaporated to dryness. The light yellow crystalline residue of the extraction had a weight of 2.58 g.

Yield 55% of adamantane-2-one.

EXAMPLE 9

While stirring, 10.0 g. of phosphor-pentoxide were added to 50 ml. of 96% sulphuric acid. The mixture was brought to a temperature of 50° C. and 6.1 g. of 1-hydroxy-adamantane were added. The resultant mixture was stirred at 50° C. for two hours.

Yield 43% of adamantane-2-one.

EXAMPLE 10

5.0 g. of 1-hydroxy-adamantane were added to 5.5 ml. of fluorosulphonic acid at room temperature, while stirring. After the adamantane compound had completely been dissolved, the mixture was allowed to stand for 18 hours. Then the mixture was poured on ice and extracted with ether. The ether extract was washed with an aqueous solution of sodium chloride and sodium hydroxide, dried over $Na_2SO_4$ and evaporated to dryness. A white crystalline product was obtained. Yield 41% adamantane-2-one.

While I have described my invention in connection with specific embodiments and applications, other modifications thereof will be readily apparent to those skilled in this art without departing from the spirit and scope of the invention as defined in the appended claims.

What is claimed is:

1. A method of producing adamantane-2-one comprising oxidizing, at a temperature between 0° C. and 100° C., an adamantane reactant selected from the group consisting of adamantane and those derivatives of adamantane substituted only at the 1 position by a moiety selected from the group consisting of hydroxy, ethoxy, methoxy, halo, carboxyl and methyl and ethyl esters of said carboxyl group, nitrate, sulfate, hydrosulfate, metaphosphate, orthophosphate, acetate, propionate, tosylate, succinate, palmitate, valerate, acetamido, nitrile substituted amino and sulfonyl substituted amino, in an oxidizing acid selected from the group consisting of sulfuric and fluorosulfonic acid, the concentration of the oxidizing acid in the reaction medium except for the adamantane reactant being at least 75%.

2. The method of claim 1 wherein the adamantane reactant is selected from the group consisting of adamantane, 1-chloroadamantane and 1-hydroxy-adamantane.

3. The method of claim 2 wherein the adamantane reactant is adamantane.

4. The method of claim 1 wherein the adamantane reactant is 1-bromo-adamantane and the reaction medium contains a silvert salt halogen binder.

5. The method of claim 1 wherein the oxidizing acid employed is 75% to 100% sulfuric acid.

6. The method of claim 5 wherein sulfur trioxide is present.

7. The method of claim 5 wherein in addition to the sulfuric acid group there is present a base weaker than water and selected from the group consisting of phosphoric acid, aliphatic carboxylic acids and hydrohalic acids.

8. The method of claim 7 wherein the oxidation is carried out in the presence of a mixture of sulfuric acid and phosphoric acid.

References Cited

FOREIGN PATENTS 646,581  7/1964  Belgium.

OTHER REFERENCES

Schlever et al. J. Am. Chem Soc., vol. 83, p. 186 (1961).

LEON ZITVER, *Primary Examiner.*

MATTHEW M. JACOB, *Assistant Examiner.*